(12) United States Patent
Ansari et al.

(10) Patent No.: US 11,893,751 B2
(45) Date of Patent: Feb. 6, 2024

(54) SYSTEM AND METHOD FOR FORECASTING LOCATION OF TARGET IN MONOCULAR FIRST PERSON VIEW

(71) Applicant: Tata Consultancy Services Limited, Mumbai (IN)

(72) Inventors: Junaid Ahmed Ansari, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 253 days.

(21) Appl. No.: 17/405,060

(22) Filed: Aug. 18, 2021

(65) Prior Publication Data

US 2022/0076431 A1 Mar. 10, 2022

(30) Foreign Application Priority Data

Sep. 9, 2020 (IN) .............................. 202021038986

(51) Int. Cl.
G06K 9/00 (2022.01)
G06T 7/215 (2017.01)
G06T 7/246 (2017.01)
G06N 3/0442 (2023.01)

(52) U.S. Cl.
CPC ........... *G06T 7/215* (2017.01); *G06N 3/0442* (2023.01); *G06T 7/246* (2017.01); *G06T 2207/10016* (2013.01); *G06T 2207/20084* (2013.01)

(58) Field of Classification Search
CPC .............................. G06V 40/25; G06N 3/0442
See application file for complete search history.

(56) References Cited

U.S. PATENT DOCUMENTS

| | | | |
|---|---|---|---|
| 11,195,418 B1* | 12/2021 | Hong | G08G 1/166 |
| 2017/0255832 A1* | 9/2017 | Jones | G06V 10/454 |
| 2020/0394413 A1* | 12/2020 | Bhanu | A63B 67/002 |
| 2023/0088912 A1* | 3/2023 | Villegas | G06N 3/044 |
| | | | 706/23 |

OTHER PUBLICATIONS

Styles, Oliver, Victor Sanchez, and Tanaya Guha. "Multiple object forecasting: Predicting future object locations in diverse environments." Proceedings of the IEEE/CVF Winter Conference on Applications of Computer Vision. 2019 (Year: 2019).*

(Continued)

*Primary Examiner* — Emily C Terrell
*Assistant Examiner* — Owais Iqbal Memon
(74) *Attorney, Agent, or Firm* — Finnegan, Henderson, Farabow, Garrett & Dunner, LLP (57) ABSTRACT

This disclosure relates generally to system and method for forecasting location of target in monocular first person view. Conventional systems for location forecasting utilizes complex neural networks and hence are computationally intensive and requires high compute power. The disclosed system includes an efficient and light-weight RNN based network model for predicting motion of targets in first person monocular videos. The network model includes an auto-encoder in the encoding phase and a regularizing layer in the end helps us get better accuracy. The disclosed method relies entirely just on detection bounding boxes for prediction as well as training of the network model and is still capable of transferring zero-shot on a different dataset.

11 Claims, 3 Drawing Sheets

(56) References Cited

OTHER PUBLICATIONS

Srivastava, Nitish, Elman Mansimov, and Ruslan Salakhudinov. "Unsupervised learning of video representations using lstms." International conference on machine learning. PMLR, 2015. (Year: 2015).*

Yao, Yu, et al. "Egocentric vision-based future vehicle localization for intelligent driving assistance systems." 2019 International Conference on Robotics and Automation (ICRA). IEEE, 2019. (Year: 2019).*

Rasouli, Amir, Iuliia Kotseruba, and John K. Tsotsos. "Pedestrian action anticipation using contextual feature fusion in stacked rnns." arXiv preprint arXiv:2005.06582 (May 2020). (Year: 2020).*

Luo et al., "Probabilistic Multi-modal Trajectory Prediction with Lane Attention for Autonomous Vehicles," (2020).

Mao et al., "Learning Trajectory Dependencies for Human Motion Prediction," (2020).

Martinez et al., "On human motion prediction using recurrent neural networks," (2017).

Wang et al., "PVRED: A Position-Velocity Recurrent Encoder-Decoder for Human Motion Prediction," (2021).

Yao et al., "Egocentric Vision-based Future Vehicle Localization for Intelligent Driving Assistance Systems," (2019).

* cited by examiner

SYSTEM AND METHOD FOR FORECASTING LOCATION OF TARGET IN MONOCULAR FIRST PERSON VIEW

PRIORITY CLAIM

This U.S. patent application claims priority under 35 U.S.C. § 119 to: India Application No. 202021038986, filed on Sep. 9, 2020. The entire contents of the aforementioned application are incorporated herein by reference

TECHNICAL FIELD

The disclosure herein generally relates to the field of motion forecasting, and, more particularly, to system and method to forecasting of motion of a target in monocular first person view.

BACKGROUND

Forecasting of target motion in first person is typically performed by using complex neural networks. Applications of such target motion forecasting includes, but are not limited to, autonomous cars, human motion, and so on.

Some of the applications such as autonomous cars have access to powerful computers with multiple CPUs and GPUs and therefore their system's real-time performance is not affected by the complexity of the network model used. On the contrary, there are applications such as a social robot for all, where the system requirements includes a lightweight and simple network model, as the social robots cannot afford to have high end sensors and heavy compute resources because of monetary and size constraints. In addition to this, it cannot be sweating most of its compute power on just one task (forecasting pedestrian's motion) if it has to be operational for long. Similarly, system requirements for a visual assistance system (for people who are visually challenged), in addition to being accessible to all regardless of their economic standards, it has to be small in size so that it can carried for long and be power efficient for operational longevity. In accordance, for certain application, the system constraints includes less sensors, and low compute and memory resources.

SUMMARY

Embodiments of the present disclosure present technological improvements as solutions to one or more of the above-mentioned technical problems recognized by the inventors in conventional systems. For example, in one embodiment, a method for forecasting location of a target in monocular first person view is provided.

The processor-implemented method includes receiving, via one or more hardware processors, a sequence of past bounding boxes, wherein each bounding box of the sequence of past bounding boxes enclosing the target in a frame from amongst a sequence of frames, wherein the sequence of frames associated with a set of past locations of the target. Further, the method includes predicting, via the one or more hardware processors, in real-time, a sequence of future bounding box locations corresponding to future locations of the target based on the sequence of past bounding boxes using a network model, wherein the network model comprising an encoder block having a first Long Short Term Memory (LSTM) and a second LSTM operating collectively as an auto-encoder, a decoder block comprising a third LSTM and a trajectory concatenation layer. The method for predicting the sequence of future bounding box locations includes determining, by the encoder block, a representation vector of a predetermined size based on a bounding box information associated with the sequence of past bounding boxes, the bounding box information indicative of a history associated with the set of past locations of the target; predicting, by the decoder block, a future velocity of the target based on the representation vector; and converting, by a trajectory concatenation layer, the future velocities into the sequence of future bounding box locations of the target.

In another aspect, a system for forecasting location of a target in monocular first person view is provided. The system includes a memory storing instructions, one or more communication interfaces; and one or more hardware processors coupled to the memory via the one or more communication interfaces, wherein the one or more hardware processors are configured by the instructions to receive, a sequence of past bounding boxes, wherein each bounding box of the sequence of past bounding boxes enclosing the target in a frame from amongst a sequence of frames, wherein the sequence of frames associated with a set of past locations of the target. Further, the one or more hardware processors are configured by the instructions to predict, in real-time, a sequence of future bounding box locations corresponding to future locations of the target based on the sequence of past bounding boxes using a network model, wherein the network model comprising an encoder block having a first Long Short Term Memory (LSTM) and a second LSTM operating collectively as an auto-encoder, a decoder block comprising a third LSTM and a trajectory concatenation layer. The one or more hardware processors are configured by the instructions to predict the sequence of future bounding box locations by determining, by the encoder block, a representation vector of a predetermined size based on a bounding box information associated with the sequence of past bounding boxes, the bounding box information indicative of a history associated with the set of past locations of the target; predicting, by the decoder block, a future velocity of the target based on the representation vector; and converting, by a trajectory concatenation layer, the future velocities into the sequence of future bounding box locations of the target.

In yet another aspect, a non-transitory computer readable medium for forecasting location of a target in monocular first person view is provided. The processor-implemented method includes receiving, via one or more hardware processors, a sequence of past bounding boxes, wherein each bounding box of the sequence of past bounding boxes enclosing the target in a frame from amongst a sequence of frames, wherein the sequence of frames associated with a set of past locations of the target. Further, the method includes predicting, via the one or more hardware processors, in real-time, a sequence of future bounding box locations corresponding to future locations of the target based on the sequence of past bounding boxes using a network model, wherein the network model comprising an encoder block having a first Long Short Term Memory (LSTM) and a second LSTM operating collectively as an auto-encoder, a decoder block comprising a third LSTM and a trajectory concatenation layer. The method for predicting the sequence of future bounding box locations includes determining, by the encoder block, a representation vector of a predetermined size based on a bounding box information associated with the sequence of past bounding boxes, the bounding box information indicative of a history associated with the set of past locations of the target; predicting, by the decoder block, a future velocity of the target based on the representation vector; and converting, by a trajectory concatenation layer, the future velocities into the sequence of future bounding box locations of the target.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Conventional systems (or network models) for target motion forecasting rely on multiple types of information related to the scene (including the target, for example humans) and/or the camera motion. For example, a known system relies on ego motion of the camera and 2-dimension (2D) body pose and location of the humans in the scene. Similarly, some other known systems predict the centroids of future bounding boxes by feeding either only optical flow vectors (within the bounding box) or provide bounding box coordinates in addition to the optical flow, respectively.

Predicting different aspects of human dynamics has been one of a widely known application of the target motion forecasting. Said prediction includes, for example, human activity forecasting, pose forecasting, and human trajectory forecasting by using complex neural networks, such as convolutional neural networks (CNNs) and recurrent neural networks (RNNs).

Conventional systems for human trajectory forecasting have considered applications such as surveillance, social interaction, crowd behaviour analysis or in sports. Such traditional systems rely on the bird's eye view of the scene or depend on multiple camera setup. A conventional system, SocialLSTM, utilized LSTMs to forecast human motion with social pooling. Social pooling was introduced so that network learns the interaction between different pedestrians in the scene while predicting their future. Following it, many similar models were introduced which predict future locations based on social, physical, or semantic constraints. For e.g. a known model, SocialGAN utilizes a Generative Adversial Network (GAN) framework for predicting socially plausible human trajectories. Another known system, SoPhie bases its trajectories on social and physical attention mechanism in addition to GAN in order to produce realistic trajectories. Yet another conventional system performs navigation, social, and semantic pooling to predict semantically compliant future trajectories. Similarly, a traditional system trains both on scene and pedestrian location information to predict future motion. On the other hand, another traditional system utilizes temporal correlations of interactions with other pedestrians along with spatial.

Some other conventional system have utilized different information related to the pedestrian for motion prediction. For example, a known conventional system utilizes a sequence of head poses in addition to other relevant information. Some other known systems for human trajectory forecasting in first person perspective rely on multiple information related to the pedestrian whose motion is to be forecasted, scene in which the camera and pedestrians are moving and the ego-motion of the camera. For e.g. a known system relies on camera ego-motion and 2D pose of the pedestrians to forecast their motion. Similarly, another known system rely on optical flow information and the detection bounding boxes. One slightly different system forecasts motion of individual skeleton joint locations of the pedestrian. This system too relies on multiple cues such as 2D pose (i.e. skeleton joint information), camera ego motion, and the 3D structure of the scene. However, most of the conventional systems utilize complex neural networks, thereby making the task of target trajectory prediction computationally expensive, and also requires huge memory capability.

Various embodiments disclosed herein provides method and system for accurately forecasting target motion (i.e. future locations of the target or future trajectory in real-time on machines with low compute and memory capability. For example, in an embodiment, the disclosed method and system rely solely on detection bounding boxes and no other information for target motion prediction due to which the compute and memory requirements of the system are reduced. Accordingly, the disclosed system is capable of accurately predicting future trajectories at a very high rate on a central processing unit (CPU). In an embodiment, the disclosed system includes a network model comprising an auto-encoder block, a decoder block and a regularizing layer. By incorporating an auto-encoder in the encoding phase (to encode a past information of the target motion) and a regularizing layer in the end, the system facilitates in boosting the accuracy of predictions. In particular, by having two decoder LSTMs (one in auto-encoder and one for future decoding), the network model learns to encode the past input observations into a representation that not only extracts all information that is needed to extrapolate the future instances but also to make sure that the learned latent vector (representation) is actually representative of the entire input.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
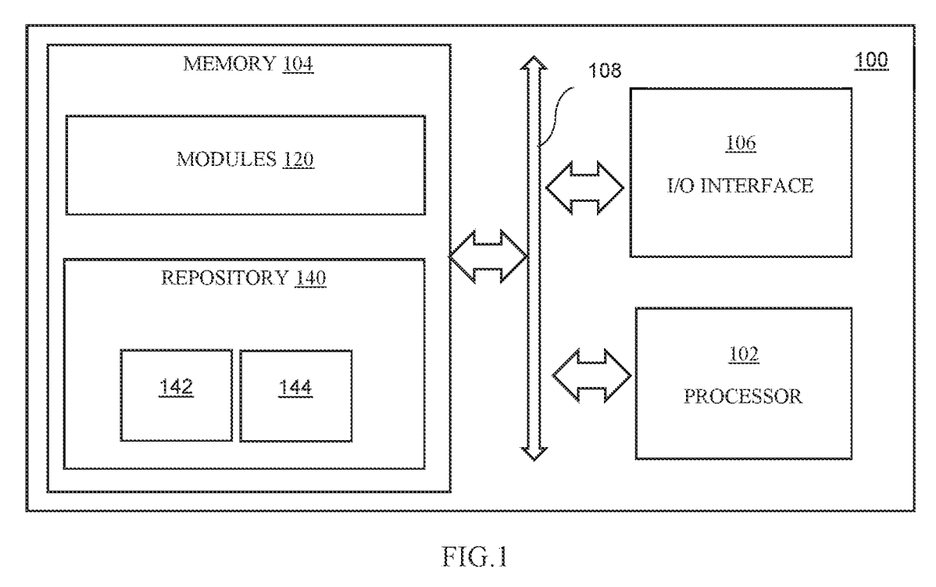
FIG. 1 illustrates a system for forecasting of motion of a target in first person view system according to some embodiments of the present disclosure.
Figure 2:
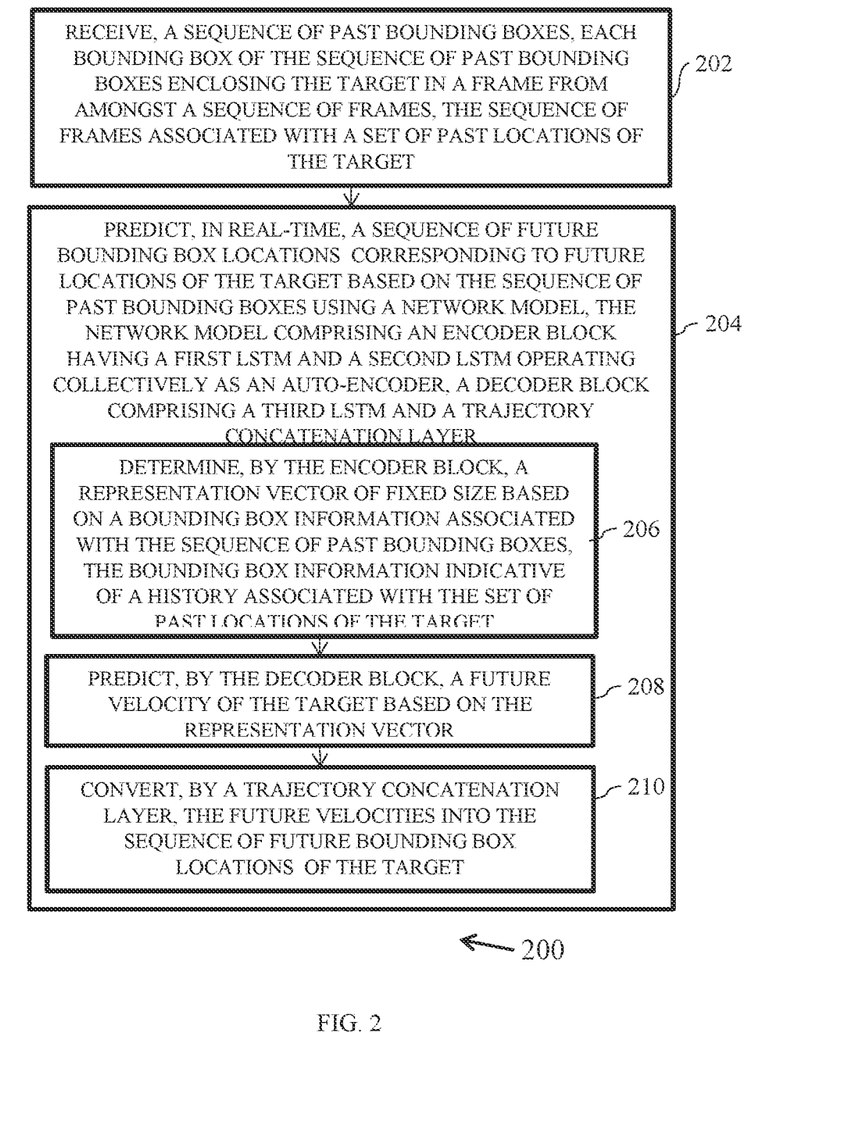
FIG. 2 is a flow diagram of a method for forecasting of motion of a target in first person view according to some embodiments of the present disclosure.
Figure 3:
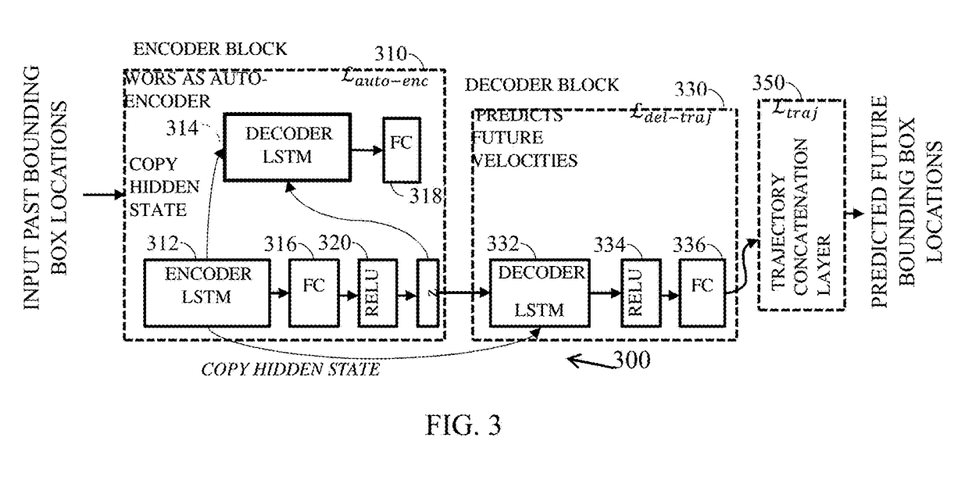
FIG. 3 illustrates an example block diagram of a network model for forecasting of motion of a target in first person view in accordance with some embodiments of the present disclosure.

Referring now to the drawings, and more particularly to FIG. 1 through 3, where similar reference characters denote corresponding features consistently throughout the figures, there are shown preferred embodiments and these embodiments are described in the context of the following exemplary system and/or method.

FIG. 1 illustrates a block diagram of a system 100 for real-time human motion forecasting in first person view, according to some embodiments of the present disclosure. The system 100 is capable of forecasting future locations of targets (for example, human beings) in first person monocular videos. The disclosed system utilizes only the bounding boxes enclosing the target in the monocular video frames, and hence is able to predict trajectories at a very high rate while being quite low in size. The disclosed system includes an auto-encoder in the encoding phase (to encode a past information of the target motion) and a trajectory concatenation layer (which is a regularizing layer) in the end to boost the accuracy of predictions.

The system 100 includes or is otherwise in communication with one or more hardware processors such as a processor 102, at least one memory such as a memory 104, and an I/O interface 106. The processor 102, memory 104, and the I/O interface 106 may be coupled by a system bus such as a system bus 108 or a similar mechanism. The I/O interface 106 may include a variety of software and hardware interfaces, for example, a web interface, a graphical user interface, and the like The interfaces 106 may include a variety of software and hardware interfaces, for example, interfaces for peripheral device(s), such as a keyboard, a mouse, an external memory, a camera device, and a printer. Further, the interfaces 106 may enable the system 200 to communicate with other devices, such as web servers and external databases. The interfaces 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 106 may include one or more ports for connecting a number of computing systems with one another or to another server computer. The I/O interface 106 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 120 and a repository 140 for storing data processed, received, and generated by one or more of the modules 120. The modules 120 may include routines, programs, objects, components, data structures, and so on, which perform particular tasks or implement particular abstract data types.

The repository 140, amongst other things, includes a system database 142 and other data 144. The other data 144 may include data generated as a result of the execution of one or more modules in the modules. In an embodiment, the repository 140 may store past information of target motion. The past information (or history) of the target motion may include information associated with the bounding boxes (also referred to as bounding box information) enclosing the target in a sequence of frames of the monocular videos.

Referring to FIG. 2, a flow diagram of a method 200 real-time target motion forecasting in first person view, according to some embodiments of the present disclosure. The method 200 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

The system 100 facilitates in real-time target motion forecasting in first person view. In an embodiment, the monocular videos of the target may be acquired using a monocular camera. The monocular camera may be static or moving while capturing the monocular videos. The monocular videos include a sequence of frames capturing the motion of the target. Examples of target may include, but are not limited to, a human being, a robot, a vehicle, a drone, and so on. Each frame may include one or more targets. For instance, consider a scene with a moving target (for example, a human) and the scene is being captured in a first person perspective by a freely moving monocular camera. At time t, there may be f frames in the video sequence. The target in the scene may be detected and tracked i.e. the target may have a detection bounding boxes for each frame in the video sequence along with track ID for each of the bounding boxes. Some of the example detector models for detecting bounding boxes in the frames may include, but are not limited to, YOLOv1™, YOLOv2™, YOLOv3™, Mask-RCNN™. In an embodiment, the disclosed system may configure the bounding box around the targets in each of the frames of the sequence. Alternatively, the disclosed system 100 may receive the sequence of past frames with bounding boxes enclosing the targets therein. Such bounding boxes enclosing the targets therein from the sequence of past frames may hereinafter be referred to as sequence of past bounding boxes. At 202, the method 200 includes receiving, via one or more hardware processors, a sequence of past bounding boxes such that each bounding box of the sequence of past bounding boxes encloses the target in a frame from amongst a sequence of frames associated with a set of past locations of the target.

At 204, the method 200 includes predicting, in real-time, a sequence of future bounding box locations corresponding to future locations of the target based on the sequence of past bounding boxes using a network model. Herein, the system 100 receives only the detection bounding boxes of the target in scene for the past k frames as:

{f−k, f−k+1, f−k+2, . . . , f}.

If at time 't', the frame is 'f', then the system 100 is capable of predicting the bounding boxes for the future f+p frames. Formally, consider $B=\{b_{f-k}; b_{f-k+1}, \ldots, b_f\}$ a sequence of bounding boxes in the past k frames relative to the frame f (inclusive of f). The disclosed system 100 is capable of obtaining P≡{$b_{f+1}$; $b_{f+2}$, ..., $b_{f+p}$} a sequence of bounding boxes for the future p frames.

The disclosed system includes a network model for predicting the sequence of future bounding box locations in real-time. A block diagram 300 of the network model is illustrated with reference to FIG. 3.

Referring to FIG. 3, the network model 300 includes an encoder block 310 operating as an auto-encoder, a decoder block 330 and a trajectory concatenation layer 350. The encoder block includes an encoder LSTM (referred to as a first LSTM 312), a decoder LSTM (referred to as a second LSTM 314), a first FC 316, a ReLU function 320 and a second FC 318. The decoder block 330 includes a decoder LSTM (referred to as third LSTM 332), ReLU function block 334, and a FC block 336. The encoder block 310 processes the information for the input sequence and produces a predetermined length representation. The decoder block 330 takes as input the learned representation from the previous block and predicts the information for the future bounding box locations. The trajectory concatenation layer 350 converts the predicted outputs from the decoder block 330 to actual future locations. The entire network model 300 is trained end-to-end and no pre-processing of any sort is performed on the input sequence. The method of predicting the sequence of future bounding box locations by the network model 300 is described further with reference to 206-210 (refer FIG. 2) in conjunction with FIG. 3.

At 206, the method 200 includes determining, by the encoder block 310, a representation vector of predetermined size (or a fixed size) based on a bounding box information associated with the sequence of past bounding boxes. The bounding box information is indicative of a history associated with the set of past locations of the target.

The encoder block 310 is essentially an LSTM based auto-encoder. In an embodiment, the encoder block 310 includes an encoder LSTM (referred to as a first LSTM 312), a decoder LSTM (referred to as a second LSTM 314), a first FC, a ReLU function and a second FC block.

Assuming that at time t, the video sequence may have f frames. The input to the encoder block, I, is a sequence of k, 8-dimensional vectors, I∈ $\mathbb{R}^{k \times 8}$, which combines different aspects of the target's bounding box information observed over past k frames. Each vector in the sequence is made up of centroid of the bounding box $C_{xy} \in \mathbb{R}_+^2$, its dimensions in terms of width (w) and height (h), where h, w∈ $\mathbb{R}_+$ and change in the centroid and its dimension, each in $\mathbb{R}_+$. Hence, the bounding box information may include, centroid, width, height, velocity of centroid, change in width and height of the respective bounding box.

Formally, the input sequence, I, can be written as {B}$_{i=f-k}^{f}$={$B_{f-k}$, $B_{f-k+1}$, $B_{f-k+1}$, ... $B_f$}, where each B is an 8-dimensional vector, $B_i$=($cx_i$, $cy_i$, $w_i$, $h_i$, $\Delta c_{xi}$, $\Delta c_{yi}$, $\Delta w_i$, $\Delta h_i$)

i.e. B∈ $\mathbb{R}^8$. The Δ terms (or change terms) are computed as: $\Delta U_i$=$U_i$-$U_{i-1}$ for $\forall U \in \{c_x, c_y, w, h_g\}$.

The Encoder LSTM, $\varepsilon_{enc}$ (i.e. the first encoder), of this block runs through the input sequence, I≡{B}$_{i=f-k}^{f}$, and generates a final hidden state vector, $H_f^e$ which summarizes the complete sequence of bounding box information. The final state vector is then fed to a fully connected layer, $\mathcal{FC}_{enc}^e$ which maps it to a vector of 256 dimensions, $Z_f$.

The Decoder LSTM (i.e. the first decoder), $D_{enc}$ on the other hand, takes the encoded representation $Z_f$ and runs k times while taking the same $Z_f$ as input at every iteration to reproduce k hidden states, {$H_i^d$}$_{i=f}^{f-k}$, one for each iteration, which are then passed through an $\mathcal{FC}_{enc}^d$ to map it to the input dimension i.e. $\mathbb{R}^{k \times 8}$. Herein, the input sequence is reproduced in the reverse direction. If the decoding is performed in the reverse order of the encoded input, the decoder may have to decode the last input which is closest to the last input into the encoder.

All the above process can be formalized as following (without explicitly showing the reliance of LSTMs on the hidden states of their previous iterations):

$$H_f^e = \varepsilon_{enc}(I) \tag{1}$$

$$Z_f = \mathcal{FC}_{enc}^e(H_f^e) \tag{2}$$

$$\{H_i^d\}_{i=f}^{f-k} = \mathcal{D}_{enc}(Z_f) \tag{3}$$

$$\hat{I} = \mathcal{FC}_{enc}^d(\{H_d^i\}_{i=f}^{f-k}) \tag{4}$$

As the decoder LSTM (i.e. the second LSTM) of the encoder block 310 of the network model tries to reproduce the input itself, an objective function (Eq. 5) can be introduced which penalizes the network model based on how far it is from the actual input. This objective function makes sure that the network model 300 learns the right representation, in this case $Z_f$, which adequately defines the past information of the bounding boxes. The objective function is indicative of minimization of error in reconstructing the input sequence of the bounding box information in reverse order. The effect of this is shown in an example scenario illustrated later in the description (please refer to Table V).

$$\mathcal{L}_{auto-enc} = \frac{\sum_{i=k-f}^{f} |\hat{I} \ominus I|}{k \times 8} \tag{5}$$

Where ⊖, represents element-wise vector subtraction operation. There are two things to note here: a) we reverse the input sequence, I, and add negative sign to components corresponding to the velocities and change in dimension of bounding boxes and b) the auto-encoder is not pre-trained and this objective is a part of the overall objective function (Eq. 11).

The representation vector is provided as input to the decoder block 330. At 208, the method 200 includes predicting, by the decoder block 330, a future velocity of the target based on the representation vector. The decoded block 330 includes an LSTM $\mathcal{D}_{enc}$ (i.e. the third LSTM), and a FC layer, $\mathcal{FC}_{enc}$ which work in the similar manner as the decoder of the encoder block 310 with two important differences: a) it runs to predict the future and not to reproduce the input and b) it only predicts the velocity and dimension change components i.e. it predicts only the future instances of $\Delta c_x$, $\Delta c_y$, $\Delta w$ and $\Delta h$.

The working of the decoder block 330 is as follows. The decoder block 330 takes the latent representation $Z_f$ from the encoder block 310 and runs p times while taking the same $Z_f$ as the input. At every iteration, it produces a hidden state vector $H_i$, where i∈{f+1, f+2, ..., f+p} which is then fed to $\mathcal{FC}_{dec}$, which maps it to a vector, V of 4-dimension, ($\Delta c_x$, $\Delta c_y$, $\Delta w$, $\Delta h$), i.e. 0∈ $\mathbb{R}_+^4$. Formally, the above process can be defined as follows:

$$\{H_i\}_{i=f+1}^{p} = \mathcal{D}_{dec}(Z_f) \tag{6}$$

$$\{\hat{v}_i\}_{i=f+1}^{p} = \mathcal{FC}_{dec}(\{H_i\}_{i=f+1}^{p}) \tag{7}$$

On applying supervision at this stage of the network model, the supervising objective is:

$$\mathcal{L}_{del\text{-}traj} = \frac{\sum_{i=f+1}^{p}|\hat{V} \ominus V|}{p \times 4} \qquad (8)$$

Where $V \in \mathbb{R}^{k \times 8}$ is the ground truth for the predicted velocity of the centroid ($\Delta c_x$, $\Delta c_y$) and dimension change ($\Delta w$, $\Delta h$) of the bounding boxes for the future p frames.

Every time the decoder LSTM, $\mathcal{D}_{dec}$ starts to decode the future sequences of a trajectory, its hidden state, $H_f$ are always initialized with the final hidden state of the encoder LSTM, $H_f^e$, i.e. $H_f = H_f^e$. Herein, it may be understood that as the future motion of the target (for example, the human) is not going to be much different from its past motion which is already encoded in the hidden state of the encoder, the decoder LSTM is loaded with this knowledge (i.e. the final hidden state of the encoder LSTM) before it even starts decoding. In other words, it may be considered as a way of transferring the physics of motion to the future decoder.

At 210, the method 200 includes converting, by a trajectory concatenation layer 350, the future velocities into the future locations of the target. The trajectory concatenation layer 350 acts as a regularizer. The trajectory concatenation layer 350 is composed of a multivariate differentiable function, $\mathbb{R}$, which convert the predicted future velocities of the centroids and the change in dimension of detection bounding boxes into a sequence of locations and dimension of the future bounding boxes.

$$\{\hat{O}_i\}_{i=f+1}^{p} = \mathcal{G}(\{\hat{V}_i\}_{i=f+1}^{p}, I_f^{\nabla}) \qquad (9)$$

$$\hat{O}_{f+1} = \begin{cases} I_f^{\nabla} \oplus \hat{V}_{f+1} & \text{for, } i = 1 \\ \hat{V}_{f+i-1} \oplus \hat{V}_{f+1} \forall i = 2 \dots p \end{cases} \qquad (10)$$

Where, with slight abuse of notation, $I_f^{\nabla} \in I$ represents the centroid and dimensions (w and h) of the bounding box of the last input frame f, i.e. $I_f^{\nabla} = (cx_f, cy_f, w_f, h_f)$, and $\hat{O} \in \mathbb{R}^{k \times 8}$ is the sequence of centroid and dimension information of the predicted future p bounding boxes; $\oplus$ represents element-wise vector addition.

The supervision is applied on the result of this layer. As we will discuss in detail in our later sections (see result) that presence of this layer yields better prediction accuracy with negligible overhead as this layer does not have any learnable parameters. The supervising objective function is as follows:

$$\mathcal{L}_{traj} = \frac{\sum_{i=f+1}^{p}|\hat{O} \ominus O|}{p \times 4} \qquad (11)$$

Where, $O \in \mathbb{R}^{k \times 4}$ is the ground truth centroid ($c_x, c_y$) and dimension (w, h) of bounding box in the predicted sequence of p future frames.

Supervising on the trajectory concatenation layer 350 layer gives better result because of the fact that this layer which is a multi-variate differentiable function, generates multiple new constraints for every predicted vector without adding any extra free parameter to be learned, thereby helping the model network learn better and hence produce better predictions, as will be seen further in Table V.

In an embodiment, the network model may be trained end-to-end by minimizing the following objective function which is a linear combination of the above discussed objectives, $\mathcal{L}_{auto\text{-}enc}$ and $\mathcal{L}_{traj}$ in Eq. 5 and Eq. 11, respectively:

$$\mathcal{L} = \alpha \cdot \mathcal{L}_{auto\text{-}enc} + \beta \cdot \mathcal{L}_{traj} \qquad (12)$$

Where, $\alpha \in \mathbb{R}_+$ and $\beta \in \mathbb{R}_+$ are hyper-parameters which decide the importance of the corresponding loss term.

An example of target location forecasting in first person view is described further in the description below.

Example Scenario:

In the present example implementation, the network model was implemented using PyTorch™ deep learning framework. All the RNNs were implemented using a single layer LSTM comprising of 512 hidden units with zero dropout. The final hidden state of the encoder LSTM of the encoder block is passed through a ReLU unit before being fed into the FC layer of the encoder block. The FC layer of the encoder block maps its input 512 dimensional hidden vector into a 256 dimensional vector. This vector is then read by both the decoder LSTMS following which we have two FCs to map them to corresponding output dimensions: FC coming after the decoder LSTM of the encoder block maps the 512 hidden vector back to 8-dimensional vector resembling the input where as the FC coming after the decoder LSTM of the decoder block maps the 512 dimensional hidden state vector into 4-dimensional vector. The 4-dimensional vector is fed to the global trajectory layer to produce actual locations of the future bounding boxes. The auto-encoder is active only during the training and is switched off while testing to save unnecessary time and compute power consumption An ablation study was conducted to evaluate the performance of our network model when trained with different combination objective functions (see Eq. 5, Eq. 8 and Eq. 11).

The disclosed network model was evaluated on three recently proposed datasets, namely CityWalks, First Person Locomotion (FPL) and Joint Attention for Autonomous Driving (JAAD), which are all captured in first person perspective. While network model was trained on only CityWalks, it was evaluated on all the three. While CityWalks and FPL datasets are quite similar in nature, JAAD is created for a different purpose, mainly created for the study of behavior study of traffic participants.

1) CityWalks: Citywalks dataset comprises of 358 video sequences which are captured by a hand held camera in first person perspective. The video sequences are captured in 21 different cities of 10 European countries during varying weather conditions. All the videos are shot in a resolution of 1280×720 at 30 Hz frame rate. The dataset also provides two sets of detections: one obtained from YOLOv3 detector and the other acquired using Mask-RCNN. In addition to detection bounding boxes, it also provides tracking information. For the present example scenario, only the Mask-RCNN detections were utilized for evaluating.
2) First Person Locomotion (FPL): This dataset comprises of multiple video sequences captured by people wearing a chest mounted camera and walking in diverse environment with multiple moving humans. The collective duration of all the video sequences is about 4.5 hours with approximately 5000 person observations. The video sequences are captured at 10 Hz (i.e. 10 frames per seconds). This video does not provide detection bounding boxes. However, it does provide the 2D pose of all the humans. As the disclosed network model relies solely on detection bounding boxes, to use this dataset for the evaluation, the 2D poses were converted into detection bounding boxes.

3) Joint Attention for Autonomous Driving (JAAD): This video dataset was primarily created for the study of behaviour of traffic participants. The dataset is made up of 346 videos with about 82032 frames captured by a wideangle camera mounted behind the wind shield below the rear-view mirror of two cars. Most of the videos are captured at a resolution of 1920×720 pixels and few are shot at 1280×720 pixel resolution. All the video sequences are captured at real-time frame rate i.e. at 30 Hz. This dataset also comes with detection bounding box and track information for each pedestrian in the scene. As the dataset is created with behavioural analysis of traffic participants in mind, it consists of pedestrians involved in different kind of motion behavior for e.g. pedestrians could stop while walking and again start walking, the person reduces or increases speed in the course of motion, etc. and hence this dataset is of not much relevance in our setting. However, the disclosed network model was evaluated on this dataset too by fine-tuning our network (trained on CityWalks) on just 15% of its train set.

The network model was trained on the CityWalks dataset. Similar to CityWalks dataset, the entire dataset was split into three folds and perform a 3-fold cross validation. At every evaluation two of the 3 folds serve as training and the other as test. The hyper-parameters were tuned only on the train fold and test it on the test fold which that particular network has never seen. The reported performance is the average performance of all the three train-test combinations (see Table. I).

TABLE I

| Model | ADE | FDE | ADE | FDE |
|---|---|---|---|---|
| STED (Mask-RCNN) | 26 | 46.9 | 16.88% | 4.54% |
| STED (YOLOv3) | 27.4 | 49.8 | 21.13% | 10.10% |
| BB-encoder (both) | 29.6 | 53.2 | 27.00% | 15.85% |
| OF-encoder (both) | 27.5 | 50.3 | 21.41% | 11.00% |
| Mask-RCNN | 21.61 | 44.77 | | |

For training, the bounding box tracks in the train set are split into multiple 90 frames mini-tracks by sliding over each track with a stride of 30 frames so as to obtain mini-trajectories of 3 second length. The model was trained to predict the location and dimension of bounding boxes 2 seconds into the future by observing past 1 second data. In other words, the network was trained to take the bounding box information of past 30 frames and predict the centroid locations in 60 future frames. The network is supervised based on the training objective.

The entire network was trained end-to-end on a CPU (Intel Xeon CPU E5-2650 v 4 at 220 GHz) with 24 cores, without pre-training of any component. For training and testing, no GPU was used. The network was trained in batches of 200 for 30 epochs with a starting learning rate of 0.00141. The learning rate was halved every 5 epochs. The hyperparameters $\alpha$ and $\beta$ in Eqn. 12 were set to 1.0 and 2.0. The model was optimized using L1 loss using Adam optimizer with no momentum or weight decay.

For performance evaluation, following baseline models were used:

Spation-Temporal Encoder-Decoder (STED): It is a GRU and CNN based encoder-decoder architecture which relies on bounding box and optical flow information to forecast future bounding boxes. The network model was trained on CityWalks to compare with this state-of-the-art model (STED) on CityWalks.

1. First Person Localization (FPL): The model introduced in this work relies on 2D pose of pedestrians extracted using OpenPose and ego-motion estimates of the camera using to predict the future locations of the human. The disclosed model was compared with FPL by transferring zero-shot to FPL dataset. One important thing to note is that this dataset is captured at 10 Hz while the disclosed network model was trained on CityWalks captured at 30 Hz.

2. Dynamic Trajectory Prediction (DTP): It uses CNN to forecast the future trajectory using past optical flow frames. To compare with DTP, the disclosed network model was fine-tuned on just 15% of training samples of JAAD dataset.

The performance of our model on CityWalks dataset is presented in Table. I where the disclosed network model is compared with the all models proposed by the current state-of-the-art on this dataset. Similar to CityWalks, disclosed network model was trained to predict a sequence of bounding box centroids for 60 time steps into the future by observing bounding boxes of past 30 time steps, i.e. disclosed network model predict 2 seconds into the future; as discussed earlier, in contrast to disclosed network model, CityWalks also takes optical flow as input.

It is clear from Table. I that that disclosed network model which is a simple RNN based architecture (trained on Mask-RCNN detections) consistently performs better than the STED model and all its variants. In the table, it is also reported as to how much the disclosed network model improve over the corresponding model in percentage (%) shown in columns Improvement (ADE) and Improvement (FDE); this metric is computed as: |dm−om|/dm, where dm and om are the performances of the other and disclosed network models, respectively. While the disclosed network model surpassed the prediction metrics for all variants proposed in CityWalks, it is interesting to see disclosed network model performing approximately 16% and 27% better than BB-encoder variant of CityWalks as, just like us, this variant does not use optical flow and relies solely on bounding boxes. The performance is mainly due to the presence of an extra decoder in the encoding phase and the global trajectory concatenation layer.

3) Zero-shot transfer on FPL dataset: To demonstrate the efficacy of disclosed network model which was trained on CityWalks, the disclosed network model was directly deployed on the test set of the FPL dataset and compared with the models proposed in FPL dataset (see Table II).

TABLE II

| Model | FDE@10 | FDE@20 |
|---|---|---|
| ConstVel | 107.15 | — |
| NNeighbor | 98.38 | — |
| SocialLSTM | 118.1 | 223.16 |
| FPL (Lin) | 88.16 | — |
| FPL (Xin) | 81.86 | — |
| FPL (Main) | 77.26 | 124.42 |
| (zero-shot) | 85.28 | 119.21 |

One important thing to note is that this dataset is captured at 10 Hz while CityWalks is captured at 30 Hz. To evaluate, the disclosed network model take a sequence of boxes from past 10 frames and predict for 10 and future frames. As presented in Table II, the disclosed network model performs better than the constant velocity, Nearest Neighbor, and Social LSTM based methods by a considerable margin. Additionally, disclosed network model also perform better than a variant (FPL(Lin)) of FPL(Main) model which takes only centroid of the pedestrians.

4) Results on JAAD dataset: The primary objective of evaluating disclosed network model on this (not so similar) dataset, was to see how well the disclosed network model handles different kind of behavior based motion of pedestrians. This dataset was created for studying behavior of traffic participants (herein only humans were considered in this context). In this dataset, humans can be observed moving in ways which one does not encounter in FPL or CityWalks datasets, for example, humans slowing down or stopping after walking some distance, or accelerating after few time steps, etc. As expected, the disclosed model does not directly transfer to this dataset as shown in Table III.

TABLE III

| Model | FDE@5 | FDE@10 | FDE@15 |
| --- | --- | --- | --- |
| Constant Acceleration (CA) | 15.3 | 28.3 | 52.8 |
| Constant Velocity (CV) | 16 | 26.4 | 47.5 |
| DTP (5 Optical flow frames) | 9.4 | 19.3 | 35.6 |
| DTP (10 Optical flow frames) | 9.2 | 18.7 | 34.6 |
| Disclosed system (10 bounding boxes) (zero-shot transger) | 20.39 | 43.88 | 70.41 |
| Disclosed system (6 bounding boxes) (15% fine-tuning) | 9.07 | 19.88 | 35.52 |
| Disclosed system (10 bounding boxes) (15% fine-tuning) | 7.72 | 17.84 | 34.2 |

However, after fine-tuning the disclosed model with just 15% of the training sample (randomly sampled from sequences 1-250) it performs on par with the state-of-the-art method for the test set (sequence 251-346) of this dataset. In a prior art method, input includes optical flow frames to predict future locations of pedestrians. Again, as the test set for the disclosed model and said prior art are same, the prediction performance for Constant Acceleration and Constant Velocity methods were directly acquired from said prior art.

5) Time and memory efficiency: The disclosed network model is capable of forecasting trajectories at a rate of 78 trajectories per second or 4684 fps on CPU with more than 4 cores (see Table IV).

TABLE IV

| CPU (cores) | Trajectories per second (TPS) | Faster than SOTA (TPS) | FPS |
| --- | --- | --- | --- |
| 1 | 38.91 | 4.79× | 2334 |
| 2 | 54.05 | 6.65× | 3243 |
| 4 | 65.87 | 8.10× | 3952 |
| >4 | 78.06 | 9.6× | 4684 |

This is an extremely high rate when compared with the state-of-the-art which has a CNN for computing optical that itself takes 123 ms for one frame. In other words, if we ignore the overhead of other components of the STED, it still runs at only 8.1 trajectories per seconds meaning we are approximately 9.6× faster than STED and perform better. At the same time, the disclosed network model is also extremely light-weight and is of only 17.4 MBs in size.

A thorough ablation study was conducted to understand the impact different components of the disclosed network model on CityWalks (see Table V).

TABLE V

| | | $\mathcal{L}_{traj\text{-}del}$ | $\mathcal{L}_{traj}$ | Disclosed system $\mathcal{L}_{auto\text{-}enc} + \mathcal{L}_{traj}$ |
| Input | Predicted | (ADE/FDE) | (ADE/FDE) | (ADE/FDE) |
| --- | --- | --- | --- | --- |
| 30 | 15 | 6.49/11.17 | 6.44/10.97 | 6.46/10.91 |
| 30 | 30 | 11.23/20.22 | 10.99/19.61 | 10.93/19.36 |
| 30 | 45 | 16.24/31.78 | 15.81/30.92 | 15.71/30.71 |
| 30 | 60 | 21.77/44.45 | 21.27/21.11 | 21.11/43.64 |

Specifically, three models were trained, namely, 1) $\mathcal{L}_{traj\text{-}del}$: with no decoder in the encoder block i.e. without any auto-encoder loss and no global concatenation layer 2) $\mathcal{L}_{traj}$: with global trajectory layer but without the auto-decoder in the encoder block, 3) The disclosed network model $\mathcal{L}_{traj} + \mathcal{L}_{auto\text{-}enc}$: this is model comprising of all the proposed components. A sequence of bounding boxes was taken for the past 30 time steps and predict for future 15, 30, 45, and 60 frames. As is seen, Each component adds to the performance and reduces the displacement error for all the cases shown in Table V.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides a simple, fast, and light-weight RNN based system and method for forecasting future locations of target in first person monocular videos. The disclosed system accurately predicts future trajectories at a very high rate, even on a CPU.

In contrast to many previous methods which rely on multiple type of cues such as camera ego-motion or 2D pose of the target (e.g. human), the network model relies solely on bounding boxes can not only perform better but also predicts trajectories at a very high rate while being quite low in size of approximately 17 MB. Specifically, the architecture of the disclosed system includes an auto-encoder in the encoding phase of the past information and a regularizing layer in the end boosts the accuracy of predictions.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for forecasting location of a target in monocular first person view, the method comprising:

receiving, via one or more hardware processors, a sequence of past bounding boxes, wherein each bounding box of the sequence of past bounding boxes enclosing the target in a frame from amongst a sequence of frames, wherein the sequence of frames associated with a set of past locations of the target;

predicting, via the one or more hardware processors, in real-time, a sequence of future bounding boxes corresponding to future locations of the target based on the sequence of past bounding boxes using a network model, wherein the network model comprising an encoder block having a first Long Short Term Memory (LSTM) and a second LSTM operating collectively as an auto-encoder, a decoder block comprising a third LSTM and a trajectory concatenation layer, wherein predicting the sequence of future bounding boxes comprises:

determining, by the encoder block, a representation vector of a predetermined size based on a bounding box information associated with the sequence of past bounding boxes, the bounding box information indicative of a history associated with the set of past locations of the target, wherein the bounding box information comprises a set of vectors associated with the sequence of past bounding boxes, a vector from amongst the set of vectors associated with a bounding box from amongst the sequence of past bounding boxes comprising a centroid, width, height, velocity of the centroid, and a change in the width and the height of the bounding box, wherein determining the representation vector by the encoder block comprises:

generating, by the first LSTM, a final hidden state vector which summarizes a complete sequence of bounding box information;

mapping, by a fully connected layer associated with the encoder block, the final hidden state vector to the representation vector of predetermined length via a ReLU;

generating, by the second LSTM, a set of hidden state vectors in a plurality of iterations, wherein for each iteration, the second LSTM takes the representation vector as input; and passing through a fully connected layer associated with the second LSTM, the set of hidden state vectors generated in each iteration of the plurality of iterations;

predicting, by the decoder block, a future velocity and change in dimension of future bounding boxes of the target based on the representation vector, wherein predicting the future velocity and the change in dimension of future bounding boxes by the decoder block comprises:

receiving the vector representation from the encoder block;

generating, by the third LSTM, a set of hidden state vectors in a plurality of iterations, wherein generating a hidden state vector for a current iteration of the plurality of iterations by the third LSTM comprises:

taking, as input, the representation vector and hidden state vectors associated with iterations previous to the current iteration in the plurality of iterations;

generating a hidden state vector from amongst the set of hidden state vectors based on the input; and mapping the hidden state vector to a vector of four dimensions indicative of velocity and dimension change components via a ReLU followed by a fully connected layer; and converting, by a trajectory concatenation layer, the future velocities and change in dimensions of future bounding boxes into the sequence of future bounding box of the target, wherein converting future velocities and change in dimensions of the future bounding boxes comprises converting the predicted future velocities of the centroids and the change in the dimension into a sequence of locations and dimension of the sequence of the future bounding boxes using the past bounding box locations.

2. The method of claim 1, further comprises determining an objective function indicative of minimization of error in reconstructing an input sequence of the bounding box information in reverse order, the objective function represented as:

$$\mathcal{L}_{auto\text{-}enc} = \frac{\sum_{i=k-f}^{f}|\hat{I} \ominus I|}{k \times 8}$$

where, $\ominus$ represents element-wise vector subtraction operation, and
I is the input sequence.

3. The method of claim 1, further comprising applying supervision on each bounding box of the sequence of future bounding boxes in a predicted sequence of future frames based on a supervision objective function:

$$\mathcal{L}_{traj} = \frac{\sum_{i=f+1}^{p}|\hat{O} \ominus O|}{p \times 4}$$

where, $O \in \mathbb{R}^{p \times 4}$ is a ground truth centroid (cx, cy) and dimension (w, h) of the bounding box in the predicted sequence of p future frames.

4. The method of claim 3 further comprising training the network model by minimizing an objective function:

$$\mathcal{L} = \alpha \mathcal{L}_{auto\text{-}enc} + \beta \cdot \alpha \mathcal{L}_{traj}$$

where, $\alpha \in \mathbb{R}_+$ and $\beta \in \mathbb{R}_+$ are hyper-parameters to determine the importance of a corresponding loss term.

5. The method of claim 1, further comprising:
receiving a video sequence of a scene comprising a target, the video sequence comprising a set of frames corresponding to the set of past locations of the target, the video sequence captured by a monocular camera in a first person view; and
determining the sequence of past bounding boxes, each bounding box of the sequence of past bounding boxes associated with a tracking ID.

6. A system for forecasting location of a target in monocular first person view, comprising:
a memory storing instructions;
one or more communication interfaces; and
one or more hardware processors coupled to the memory via the one or more communication interfaces, wherein the one or more hardware processors are configured by the instructions to:
receive, a sequence of past bounding boxes, wherein each bounding box of the sequence of past bounding boxes encloses the target in a frame from amongst a sequence of frames, and wherein the sequence of frames associated with a set of past locations of the target;
predict, in real-time, a sequence of future bounding boxes corresponding to future locations of the target based on the sequence of past bounding boxes using a network model, wherein the network model comprising an encoder block having a first LSTM and a second LSTM operating collectively as an autoencoder, a decoder block comprising a third LSTM and a trajectory concatenation layer, wherein to predict the sequence of future bounding boxes, the one or more hardware processors are further configured by the instructions to:
determine, by the encoder block, a representation vector of predetermined size based on a bounding box information associated with the sequence of past bounding boxes, the bounding box information indicative of a history associated with the set of past locations of the target, wherein the bounding box information comprises a set of vectors associated with the sequence of past bounding boxes, a vector from amongst the set of vectors associated with a bounding box from amongst the sequence of past bounding boxes comprising a centroid, width, height, velocity of the centroid, and a change in the width and the height of the bounding box, wherein to determine the representation vector by the encoder block, the one or more hardware processors are further configured by the instructions to:
generate, by the first LSTM, a final hidden state vector which summarizes a complete sequence of bounding box information;
map, by a fully connected layer associated with the encoder block, the final hidden state vector to the representation vector of predetermined length via a ReLU;
generate, by the second LSTM, a set of hidden state vectors in a plurality of iterations, wherein for each iteration, the second LSTM takes the representation vector as input; and
pass through a fully connected layer associated with the second LSTM, the set of hidden state vectors generated in each iteration of the plurality of iterations;
predict, by the decoder block, a future velocity and change in dimension of future bounding boxes of the target based on the representation vector, wherein predicting the future velocity and the change in dimension of future bounding boxes by the decoder block, the one or more hardware processors are further configured by the instructions to:
receive the vector representation from the encoder block;
generate, by the third LSTM, a set of hidden state vectors in a plurality of iterations, wherein to generate a hidden state vector for a current iteration of the plurality of iterations by the third LSTM, the one or more hardware processors are further configured by the instructions to:
take, as input, the representation vector and hidden state vectors associated with iterations previous to the current iteration in the plurality of iterations;
generate a hidden state vector from amongst the set of hidden state vectors based on the input; and
map the hidden state vector to a vector of four dimensions indicative of velocity and dimension change components via a ReLU followed by a fully connected layer; and
convert, by a trajectory concatenation layer, the future velocities and change in dimensions of future bounding boxes into the sequence of future bounding box of the target, wherein converting future velocities and change in dimensions of the future bounding boxes comprises converting the predicted future velocities of the centroids and the change in the dimension into a sequence of locations and dimension of the sequence of the future bounding boxes using the past bounding box locations.

7. The system of claim 6, wherein the one or more hardware processors are further configured by the instructions to determine an objective function indicative of minimization of error in reconstructing an input sequence of the bounding box information in reverse order, the objective function represented as:

$$\mathcal{L}_{auto\text{-}enc} = \frac{\sum_{i=k-f}^{f} |\hat{I} \ominus I|}{k \times 8}$$

where, $\ominus$ represents element-wise vector subtraction operation, and
I is the input sequence.

8. The system of claim 6, wherein the one or more hardware processors are further configured by the instructions to apply supervision on each bounding box of the sequence of future bounding boxes in a predicted sequence of future frames based on a supervision objective function:

$$\mathcal{L}_{traj} = \frac{\sum_{i=f+1}^{p} |\hat{O} \ominus O|}{p \times 4}$$

where, $O \in \mathbb{R}^{p \times 4}$ is a ground truth centroid (cx, cy) and dimension (w, h) of the bounding box in the predicted sequence of p future frames.

9. The system of claim 8, wherein the one or more hardware processors are further configured by the instructions to train the network model by minimizing an objective function:

$$\mathcal{L} = \alpha \, \mathcal{L}_{auto\text{-}enc} + \beta \cdot \alpha \, \mathcal{L}_{traj}$$

where, $\alpha \in \mathbb{R}_+$ and $\beta \in \mathbb{R}_+$ are hyper-parameters to determine the importance of a corresponding loss term.

10. The system of claim 6, wherein the one or more hardware processors are further configured by the instructions to:
receive a video sequence of a scene comprising a target, the video sequence comprising a set of frames corresponding to the set of past locations of the target, the video sequence captured by a monocular camera in a first person view; and
determine the sequence of past bounding boxes, each bounding box of the sequence of past bounding boxes associated with a tracking ID.

11. One or more non-transitory machine readable information storage mediums comprising one or more instructions which when executed by one or more hardware processors cause:
receiving a sequence of past bounding boxes, wherein each bounding box of the sequence of past bounding boxes enclosing the target in a frame from amongst a sequence of frames, wherein the sequence of frames associated with a set of past locations of the target;
predicting in real-time, a sequence of future bounding boxes corresponding to future locations of the target based on the sequence of past bounding boxes using a network model, wherein the network model comprising an encoder block having a first Long Short Term Memory (LSTM) and a second LSTM operating collectively as an auto-encoder, a decoder block comprising a third LSTM and a trajectory concatenation layer, wherein predicting the sequence of future bounding boxes comprises:
determining, by the encoder block, a representation vector of a predetermined size based on a bounding box information associated with the sequence of past bounding boxes, the bounding box information indicative of a history associated with the set of past locations of the target, wherein the bounding box information comprises a set of vectors associated with the sequence of past bounding boxes, a vector from amongst the set of vectors associated with a bounding box from amongst the sequence of past bounding boxes comprising a centroid, width, height, velocity of the centroid, and a change in the width and the height of the bounding box, wherein determining the representation vector by the encoder block comprises:
generating, by the first LSTM, a final hidden state vector which summarizes a complete sequence of bounding box information;
mapping, by a fully connected layer associated with the encoder block, the final hidden state vector to the representation vector of predetermined length via a ReLU:
generating, by the second LSTM, a set of hidden state vectors in a plurality of iterations, wherein for each iteration, the second LSTM takes the representation vector as input; and
passing through a fully connected layer associated with the second LSTM, the set of hidden state vectors generated in each iteration of the plurality of iterations;
predicting, by the decoder block, a future velocity and change in dimension of future bounding boxes of the target based on the representation vector, wherein predicting the future velocity and the change in dimension of future bounding boxes by the decoder block comprises:
receiving the vector representation from the encoder block;
generating, by the third LSTM, a set of hidden state vectors in a plurality of iterations, wherein generating a hidden state vector for a current iteration of the plurality of iterations by the third LSTM comprises:
taking, as input, the representation vector and hidden state vectors associated with iterations previous to the current iteration in the plurality of iterations;
generating a hidden state vector from amongst the set of hidden state vectors based on the input; and
mapping the hidden state vector to a vector of four dimensions indicative of velocity and dimension change components via a ReLU followed by a fully connected layer; and
converting, by a trajectory concatenation layer, the future velocities and change in dimensions of future bounding boxes into the sequence of future bounding box of the target, wherein converting future velocities and change in dimensions of the future bounding boxes comprises converting the predicted future velocities of the centroids and the change in the dimension into a sequence of locations and dimension of the sequence of the future bounding boxes using the past bounding box locations.

* * * * *